March 15, 1949. W. L. McNAMARA ET AL 2,464,334
LEER LOADER

Original Filed Aug. 17, 1942 6 Sheets-Sheet 1

INVENTORS
William L. McNamara.
James McFee.
BY
Corbett, Mahoney & Miller
ATTORNEYS INVENTORS
William L. McNamara.
James McFee.
BY
Corbett, Mahoney & Miller
ATTORNEYS March 15, 1949. W. L. McNAMARA ET AL 2,464,334
LEER LOADER Original Filed Aug. 17, 1942 6 Sheets-Sheet 3

INVENTORS
William L. McNamara.
James McFee.
BY Corbett, Mahoney & Miller
ATTORNEYS March 15, 1949.  W. L. McNAMARA ET AL  2,464,334
LEER LOADER Original Filed Aug. 17, 1942  6 Sheets-Sheet 4

INVENTORS
William L. McNamara
James McFee.
BY
Corbett, Mahoney & Miller
ATTORNEYS March 15, 1949.  W. L. McNAMARA ET AL  2,464,334
LEER LOADER Original Filed Aug. 17, 1942  6 Sheets-Sheet 5

INVENTORS
William L. McNamara.
James McFee.
BY
Corbett, Mahoney & Miller
ATTORNEYS Patented Mar. 15, 1949

2,464,334

UNITED STATES PATENT OFFICE 2,464,334

LEER LOADER

William L. McNamara and James McFee, Lancaster, Ohio, assignors to Anchor Hocking Glass Corporation, Lancaster, Ohio, a corporation of Delaware Original application August 17, 1942, Serial No. 455,136. Divided and this application October 31, 1945, Serial No. 625,870

1 Claim. (Cl. 198—25)

Our invention relates to a leer loader. It has to do, more particularly, with that type of leer loader commonly known in the art as the "pusher bar type," and with automatic means for transferring articles of various sizes and shapes from one continuously moving conveyer to another continuously moving conveyer disposed at an angle thereto. The present application is a division of our copending application Serial Number 455,136, issued December 11, 1945 as Patent No. 2,390,725.

One of the objects of our invention is to provide improved means or apparatus for transferring articles of various sizes and shapes from one continuously moving conveyer to another continuously moving conveyer disposed at an angle thereto.

Another object of the invention is to provide automatically operable means or apparatus for transferring articles in accordance with the preceding paragraph.

A further object of the invention is to provide guide means for the articles during their transfer by the automatically operable means or apparatus aforementioned.

In its preferred form our invention contemplates the provision of leer loading apparatus comprising a continuously moving conveyer which receives the ware in upright position from the forming machine and conducts it in a single line to a continuously moving cross conveyer extending across the front end of the leer. Automatic means such, for example, as a spotter wheel, is provided for transferring the articles to the cross conveyer in upright position and properly spacing them on the cross conveyer to form a row of closely spaced articles extending across the front of the leer. A pusher bar is associated with the cross conveyer and is moved from a position behind the row of articles on the cross conveyer into engagement therewith and then horizontally over the cross conveyer. This serves to push the row of articles from the continuously moving cross conveyer onto the leer conveyer.

The foregoing and other objects and advantages of our invention will be apparent from the following description and appended claim when considered in connection with the accompanying drawings forming a part of this specification wherein like reference characters designate corresponding parts in the several views.

Figure 1:
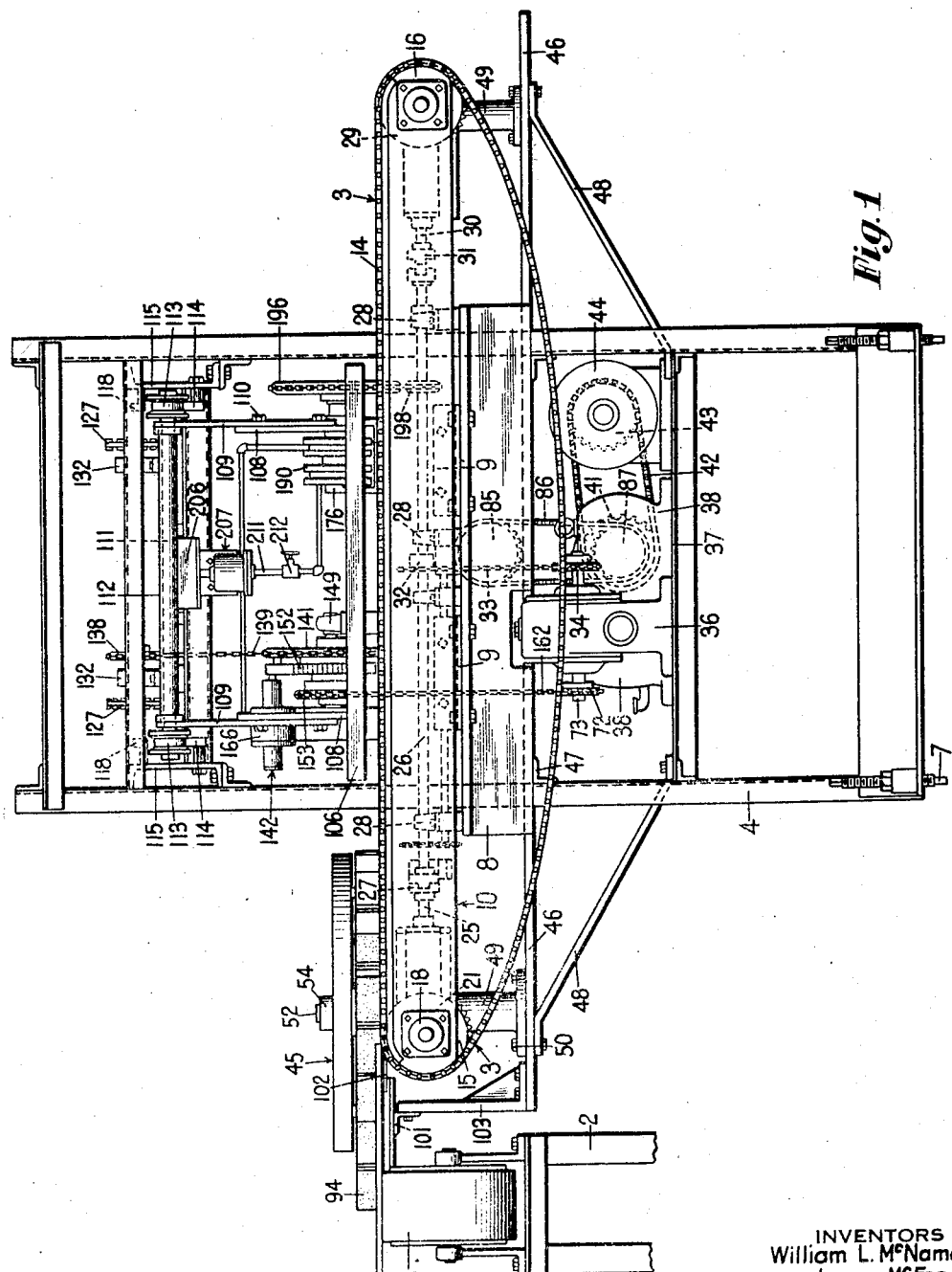
Figure 1 is a front elevational view of leer-loading apparatus constructed according to our invention.

With reference to the drawings, we illustrate a continuously moving conveyer 1 which is adapted to receive the articles in upright position after they are removed from the forming machine. This conveyer 1 is carried by a suitable supporting frame 2 and is driven in any suitable manner. The conveyer 1 is adapted to convey the ware to a point adjacent one end of the cross conveyer 3 of our leer loading apparatus. The cross conveyer 3 is supported by a frame 4 and extends across the front thereof. This frame 4, as will later appear, supports all portions of our apparatus. The frame 4 is so positioned that the conveyers 1 and 3 are associated with each other in the manner illustrated best in Figure 2 and the cross conveyer 3 extends across the front of a leer 5. The leer 5 includes a conveyer belt 6 which projects therefrom in the usual manner. Our apparatus is not connected to the leer 5 or the conveyer 1 and, therefore, our entire unit can be moved away from the units 1 and 5 whenever desired.

The frame 4 is made up of suitable angle irons and beams and is provided with leveling jacks 7 of the screw type on each of its legs. The cross conveyer 3 is carried at the front of the frame 4 intermediate the height thereof. To support the cross conveyer 3 a transversely extending angle member 8 (Figure 6) is bolted to the front vertical legs of the frame 4 intermediate the height thereof. The angle member 8 extends the full width of frame 4 and projects forwardly from the frame and carries a pair of angle brackets 9 (Figure 1) which are bolted thereto. The upstanding flange of each of these brackets 9 is bolted to a unit 10 which serves as a support for the conveyer 3. This unit 10 comprises a pair of elongated angle beams 11, the vertical flanges of which are secured together in parallel spaced relationship by means of spacers 12 which are suitably secured thereto at longitudinally spaced intervals. The horizontal flanges 13 of these beams 11 serve as supports over which the upper flight of the chain belt 14 of the conveyer 3 slides, it being apparent that the chain belt 14 extends the full width of the space between members 11 and overlaps the flanges 13 thereof. The beams 11 extend a substantial distance beyond each side of frame 4.

Figure 6:
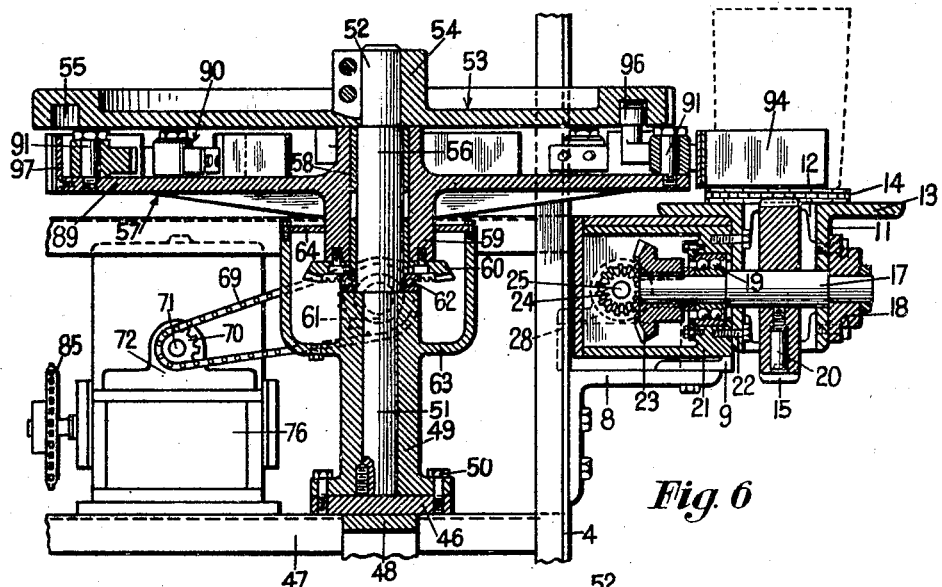
Figure 6 is a vertical sectional view taken substantially along line 6—6 of Figure 5.

The chain belt 14 is an endless belt of any suitable type. As shown best in Figures 1, 2, 6 and 7, the chain belt 14 passes around and is adapted to be driven by sprockets 15 and 16 supported on opposite ends of the supporting unit 10. The sprocket 15 is rotatably carried by a shaft 17 which is disposed transversely of the beams 11 (Figure 6). The forward end of this shaft is rotatably carried in a bearing 18 secured to the forward beam 11. The rear end of this shaft is rotatably carried in a ball bearing 19 supported by the rear beam 11. The gear 15 is keyed on the shaft 17 by means of a set screw 20. The rear end of shaft 17 projects into the gear unit 21.

Figure 2:
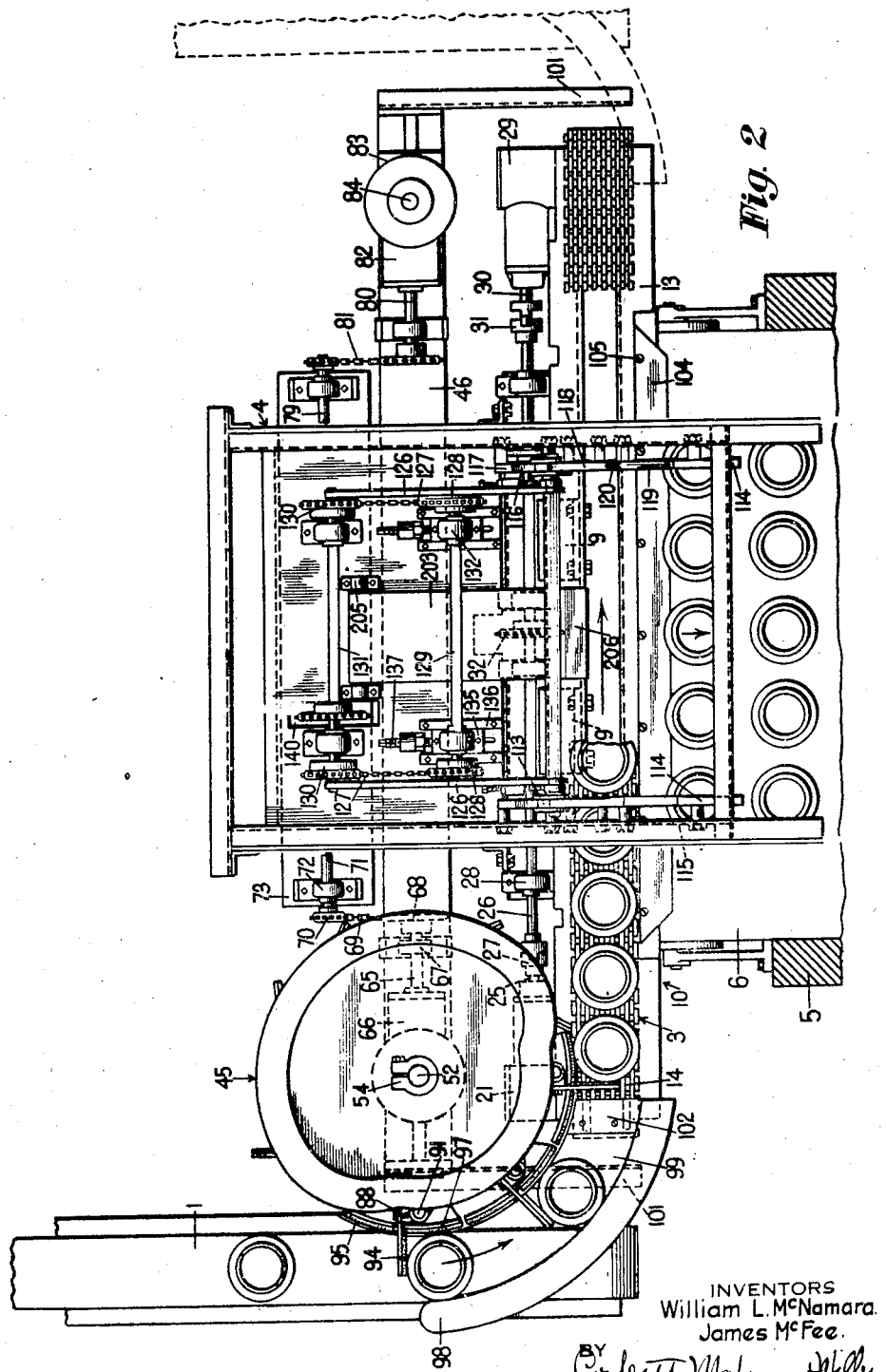
Figure 2 is a top plan view of the apparatus shown in Figure 1.
Figure 3:
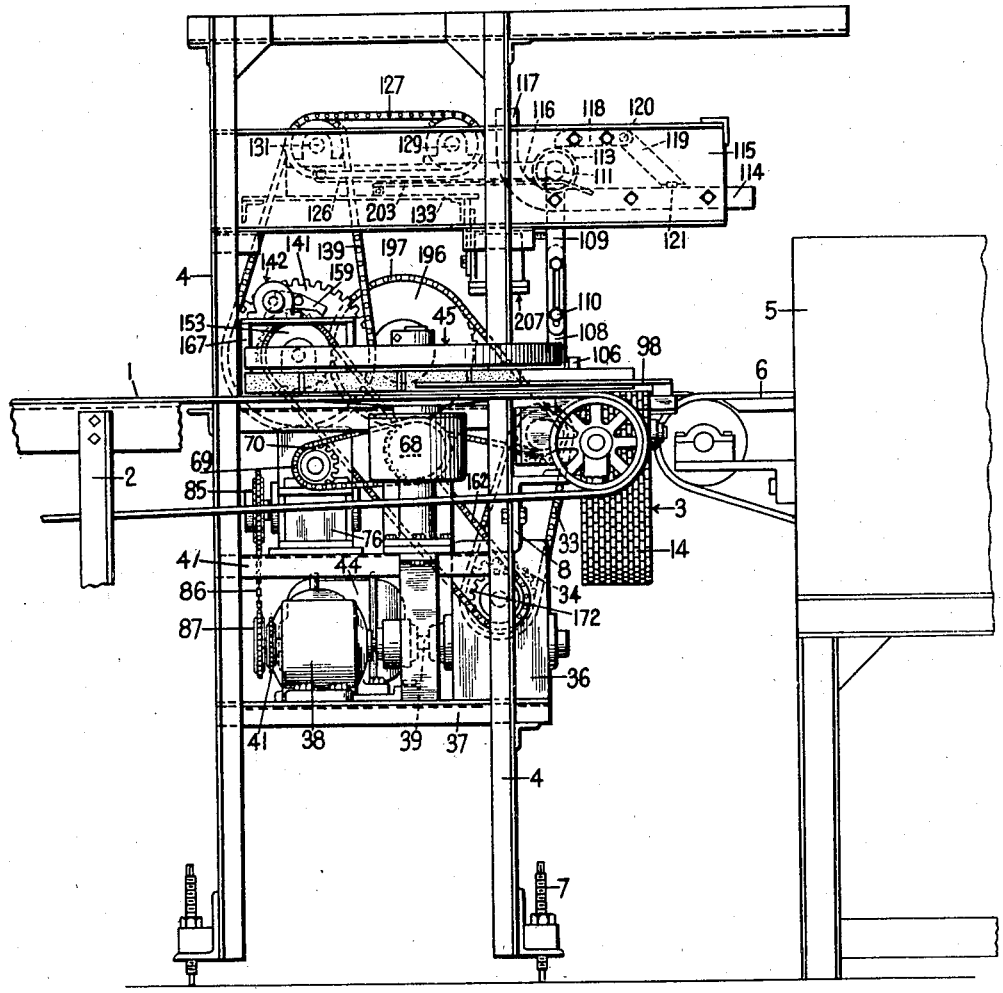
Figure 3 is a side elevational view of the apparatus shown in Figures 1 and 2.
Figure 4:
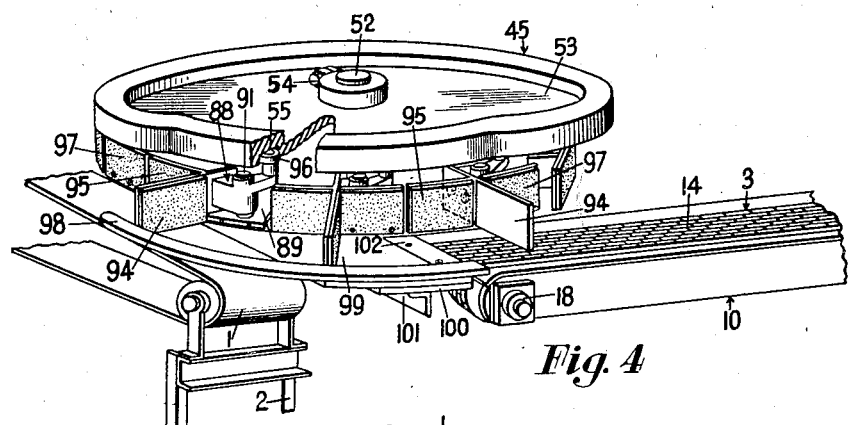
Figure 4 is a perspective view of the means provided for automatically transferring the ware from the conveyer which receives the ware from the forming machine to the cross conveyer disposed in front of the leer.

This gear unit 21 has a housing which is bolted to the rear beam 11 by means of bolts 22. This gear unit includes a bevel gear 23 keyed on the rear end of the shaft 17. This gear 23 meshes with a bevel pinion 24. This bevel pinion 24 is keyed on the end of a shaft 25. The shaft 25 (Figures 1, 2 and 8) is adapted to be selectively conneced to or disconnected from a shaft 26 by means of a jaw clutch 27. This jaw clutch may be actuated by any suitable control member. The shaft 26 extends parallel to the rear beam 11 (Figure 2). It is supported by a plurality of bearing members 28 (Figures 1 and 2) which are bolted to the upper surface of the angle member 8. This shaft extends the full width of the frame 4 and a substantial distance beyond each side thereof. The sprocket 16 is driven in exactly the same manner as the sprocket 15. It is driven by a gear unit 29 supported by the rear beam 11 adjacent the sprocket 16. This gear unit 29 has a shaft 30 projecting therefrom which may be selectively connected to or disconnected from the shaft 26 by means of a jaw clutch 31.

It will be apparent that when the jaw clutch 27 is engaged and the clutch 31 is disengaged, the upper flight of the conveyer belt 14 will travel toward the right (Figures 1 and 2) when the shaft 26 is driven. On the other hand, if the jaw clutch 27 is disengaged and the jaw clutch 31 is engaged, the upper flight of the conveyer belt will travel toward the left when the shaft 26 is rotated. This arrangement is desirable so that the apparatus may receive articles from a conveyer unit provided at either side of our apparatus. As shown by dotted lines in Figure 2, the unit 1 could be positioned on the right-hand side of our aparatus rather than the left-hand side. The shaft 26 has a large sprocket 32 keyed thereto substantially midway between the ends thereof, as shown best in Figures 1, 2 and 10. This sprocket is driven by a chain 33 which passes around a sprocket 34 spaced below and rearwardly of the sprocket 32. The sprocket 34 is keyed on a shaft 35 extending from a gear unit 36. This unit 36 is supported on a horizontal plate 37 (Figure 1). This plate 37 is secured to the frame 4 at a suitable location spaced below the conveyer unit 3. The gear unit 36 is driven by a second gear unit 38 through the medium of a shaft 39. Both of the gear units 36 and 38 may be variable speed gear units of a suitable type. The gear unit 38 is also supported by the plate 37. The gear unit 38 is driven through the medium of a shaft 40 extending therefrom. This shaft 40 has a sprocket 41 keyed thereto which is driven by a sprocket chain 42 that passes around a sprocket 43 keyed on the drive shaft of an electric motor 44. This motor 44 is also supported by the plate 37. Thus, when the motor 44 is energized and either of the clutches 27 or 31 is engaged, the conveyer chain belt will be moved continuously.

In order to transfer glass articles from the conveyer 1 to the conveyer unit 3, we provide a spotter wheel unit 45 at either end of the conveyer unit 3 depending upon the location of the conveyer unit 1. In Figures 1 and 2 we have illustrated the unit 45 located at the left-hand side of our apparatus but it can be in position at the other side of our aparatus. This unit 45 is illustrated best in Figures 1, 2, 4, 5, 6 and 7. The unit 45 is supported on the end of a plate 46 which is carried by the frame 4. This plate 46 extends a substantial distance beyond each side of the frame 4. It is supported by angle members 47 which are secured to the frame 4 and extend transversely of the plate 46. The outer ends of the plate 46 are supported by angularly disposed supports 48 which have their upper ends secured to the lower surface of the plate 46 and their lower ends secured to the plate 37 carried by the frame 4.

The unit 45 comprises a vertically disposed sleeve 49 which has a flanged foot bolted to the upper surface of the plate 46 by bolts 50, as shown in Figure 6. A vertically disposed shaft 51 is keyed in the sleeve 49. The extreme upper end of the shaft 51 has a reduced portion 52 which supports a disk-like cam member 53. This member 53 has a hub portion 54 which may be clamped to the shaft portion 52. The cam member 53 is provided with a cam groove 55 formed adjacent its periphery. Directly below the member 53 on an enlarged portion 56 of the shaft 51 is a wheel member 57. Bushings 58 are disposed in the hub 59 of wheel member 57 and around shaft portion 56. The lower end of the hub portion 59 has a bevel gear 60 bolted thereto. This gear 60 is engaged by a bevel pinion 61. A thrust bearing 62 of the ball bearing type is disposed between gear 60 and the upper end of the sleeve 49. A housing portion 63 is formed integral with the upper portion of sleeve 49 and encloses gears 60 and 61. This housing can be filled with oil. It is provided with a removable cover 64.

The pinion 61 is keyed on the inner end of a shaft 65. This shaft 65 extends through a lateral extension 66 (Figure 2) formed on the housing 63. The outer end of this shaft 65 is rotatably mounted in a bearing 67 which is supported by the plate 46. The extreme outer end of the shaft 65 has a sprocket 68 keyed thereon. This sprocket 68 is driven by a chain 69 which also passes around a sprocket 70 which is keyed on the outer end of a shaft 71. This shaft 71 is disposed parallel to the shaft 65 and is rotatably carried by bearings 72 which are carried by a plate 73. This plate 73 is supported on the frame 4 (Figure 2) by the angle members 47 which support the plate 46. The plate 73 is disposed directly behind the plate 46, extending the full width of the frame 4 and slightly beyond the sides thereof.

Figure 8:
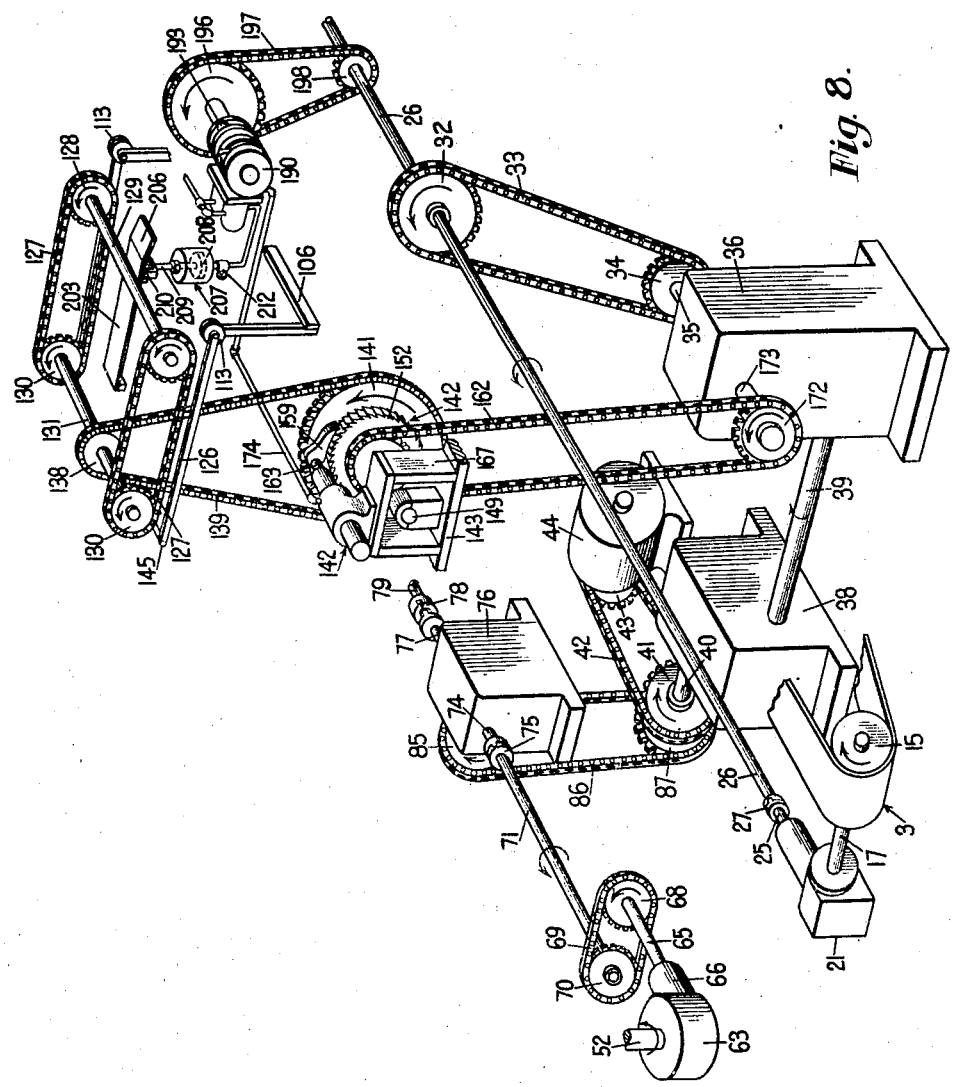
Figure 8 is a schematic view, in perspective, of the operating mechanism of our apparatus.

As shown best in Figures 2 and 8, the shaft 71 is adapted to be connected to or disconnected from a shaft 74 by means of a jaw clutch 75 which may be operated in a suitable manner. The shaft 74 is driven by a variable speed gear unit 76. The unit 76 is supported on the plate 73 intermediate the ends thereof. The gear unit 76 also drives a shaft 77 extending from the opposite side thereof. A clutch 78 is provided for selectively connecting the shaft 77 to or disconnecting it from a shaft 79. This shaft 79 is supported like the shaft 71 and drives a shaft 80, which is similar to and supported like the shaft 65, through the medium of a chain and sprocket drive 81. This shaft 80 extends into a portion 82 of a housing 83 which is like the housing 63. Within this housing gears are disposed for driving a vertical shaft 84 which is identical with shaft 51. This shaft 84 may form a part of a unit exactly like the unit 45 previously referred to. If the conveyer 1 is at the left of the apparatus, as shown in Figure 2, the parts of the unit 45 will be in position as indicated. However, if the conveyer 1 is at the opposite side of our apparatus, the members 53 and 57 may be removed from the shaft 51 and be mounted on the shaft 84 at the opposite side of the apparatus. When the unit 45 is in the position indicated, the clutch 75 will be engaged and the clutch 78 will be disengaged. However, if the unit 45 is at the opposite side of the apparatus, the clutch 78 will be engaged and the clutch 75 will be disengaged. The gear unit 76 is driven by means of a sprocket 85 and a chain 86. The chain 86 passes around a sprocket 87 keyed on the outer end of shaft 40 which is driven by motor 44.

Figure 5:
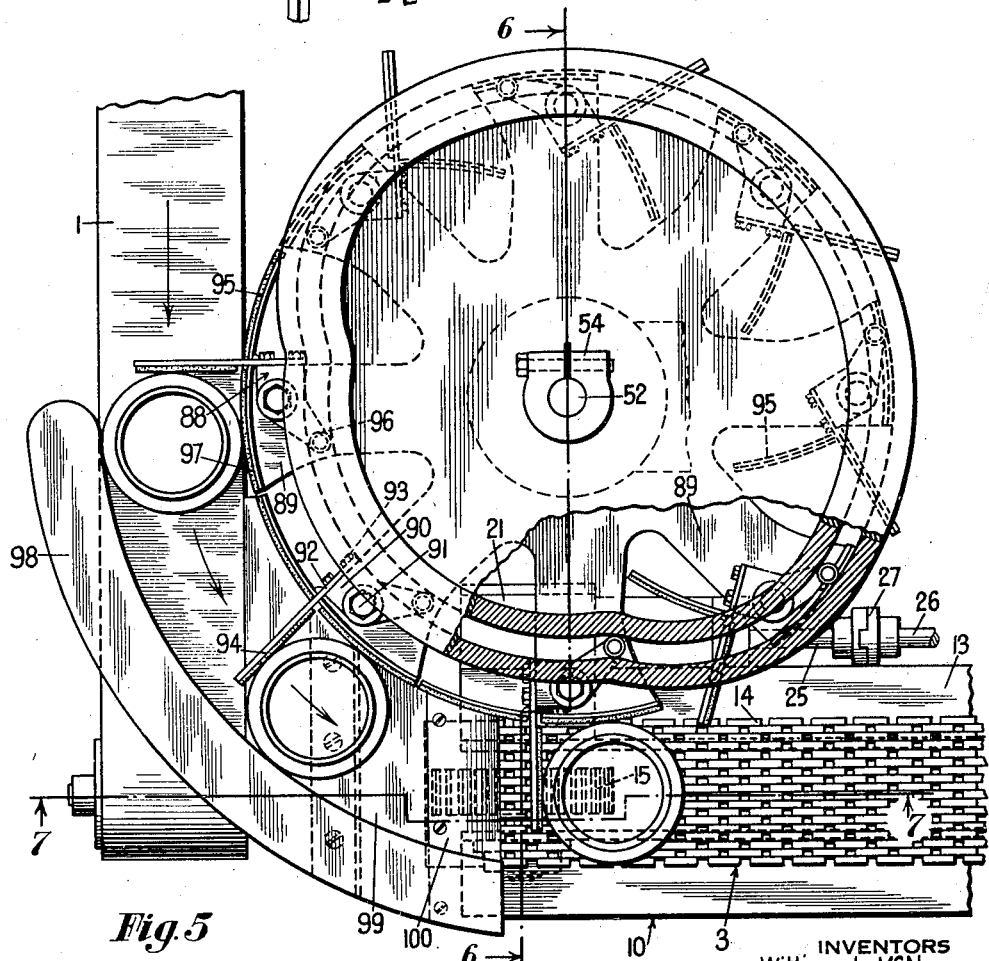
Figure 5 is an enlarged top plan view, partly broken away, of the structure shown in Figure 4.

The spotter wheel 57 will be rotated on the shaft 51 by means of the pinion 61 upon rotation of the shaft 65. It will be rotated in a counter-clockwise direction, as shown in Figures 2 and 5. As shown best in Figures 4 to 7, the wheel 57 carries an article-engaging member 88 at the outer end of each of the arms 89 of the wheel. Each article-engaging member 88 comprises a supporting member 90 which is pivoted to the arm 89 by means of a pivot pin 91. The member 90 has a flat surface at one side of the pivot point 91 to which a blade member 92 is bolted by bolts 93. The blade member 92 consists of a straight portion 94 and a curved portion 95 disposed substantially at right angles to each other. On the opposite side of the pivot point 91 the member 92 carries an upstanding roller 96. This roller 96 is disposed in the cam groove 55 of the member 53. It will be apparent that the member 90 is substantially in the form of a bell crank lever with the roller 96 supported on one end thereof and the member 92 supported on the other end thereof. The outer end of each of the arms 88 is curved and has a similarly curved article-engaging plate 97 secured thereto in upstanding position. The cam groove 55 is of such outline that as the wheel member 57 rotates relative to the cam member 53, the member 90 and the members 92 carried thereby will be swung about the pivot points 91.

Figure 7:
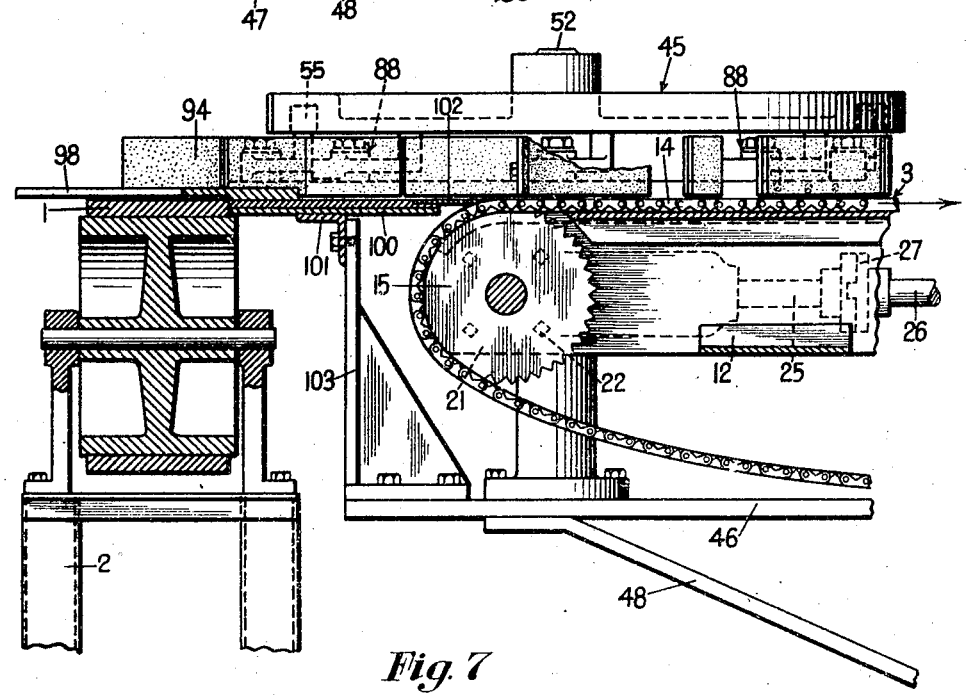
Figure 7 is a vertical sectional view taken substantially along line 7—7 of Figure 5.

As each of the article-engaging members 92 moves over the conveyer 1, the straight portion 94 thereof will be projecting radially from the wheel 57 and over the conveyer belt 1. When the member 92 is in this position, the portion 95 of member 92 will be in alignment with the two adjacent members 97. Thus, there will be no danger of articles passing between the arms 89 of the wheel. As the wheel continues to rotate, each of the members 90, as shown in Figure 5, will be swung about its pivot 91 in such a manner that both the portions 94 and 95 of the member 92 will be disposed practically within the periphery of the wheel 57. A curved guide member 98 is provided and has one end welded to a plate 99 (Figure 5). This plate 99 is secured to a second plate 100 which is fastened to an angle member 101. The plate 99 bridges the gap between the conveyer belt 1 and the conveyer belt 14. It is disposed at the same level as these belts and is provided with an extension 102 which extends over the curved part of the belt 14 as shown in Figure 7. The angle member 101 is carried on the upper end of an upstanding support 103. This support 103 has its lower end bolted to the outer end of the plate 46. The guide member 98 will be disposed parallel to the path of travel of the outer ends of the arms 89 of the wheel 57. It will be understood that if the unit 45 is at the opposite side of our apparatus, the guide 98 and plate 99, together with the supporting structure, will be duplicated at that side of the apparatus.

It will be apparent that the conveyor 1 and the conveyor 3 will be rotating continuously. Also, the spotter wheel unit 45 will be operating continuously. As the glass articles are carried by the conveyer 1 to a point adjacent the spotter wheel, the portions 94 of the article-engaging members will be extended outwardly and will engage the rear surface of each successive article. The article will then engage the guide 98. The article will be pushed from the conveyer 1 onto the plate 99 by the cooperation of member 94 and guide 98, as shown in Figure 5. The article will finally be pushed by the portion 94 onto the conveyor belt 14. Thus, the spotter wheel unit will serve to transfer articles from the conveyer 1 to the conveyer 3. As each article is pushed onto the end of the conveyer unit 3, the member 90 of each article-engaging unit will be swung in such a manner that the portion 94 of the article-engaging member will be swung inwardly toward the center of the wheel 57 so that it will quickly move out of engagement with the article positioned on the belt 14. This will prevent the article from being shoved rearwardly off the conveyer 3. As each article-engaging member again moves to a position adjacent the conveyer 1, it will be swung in such a manner that the portion 94 will project over the conveyer 1. The conveyer 1 will travel at a comparatively high rate of speed. The unit 45 will operate at a comparatively high rate of speed. However, the conveyer unit 3 will operate at a comparatively low rate of speed. This will serve to position the articles on the conveyer unit 3 in closely spaced relationship. The speed of the units 45 and 3 can be controlled independently. The speed of unit 45 can be controlled by the variable speed gear unit 76 while that of the unit 3 can be controlled by the variable speed gear units 36 and 38.

The cam member 53, the wheel member 57 and the guide member 98 will be designed for operating on articles of a particular size. If different size articles are to be transferred by the unit 45, the members 53, 57 and 98 will be replaced with members suitable for that particular size article. The article-engaging portions 94 and 97 may be covered with felt or other soft material to prevent injury to the article.

It will be apparent that as the unit 45 feeds the articles onto the conveyer unit 3 in closely spaced relationship, the belt 14 will move these articles into position in front of the leer. The articles will be assembled, therefore, as a row of closely spaced articles extending across the front of the leer. The pusher bar apparatus which we shall now describe will engage the rear side of this row of articles and will shove same off the belt 14 onto the conveyer belt 6. To bridge the gap between the belt 14 and the belt 6, a plate 104 is provided which extends for the full width of the belt 6. This plate 104 (Figure 2) is fastened to the forward beam 11 of conveyer unit 3 by means of screws 105.

Having thus described our invention, what we claim is:

Apparatus for transferring articles from one continuously moving conveyer to another continuously moving conveyer disposed at an angle thereto, comprising a spotter wheel unit disposed within the angle between said conveyers, said spotter wheel unit comprising a plurality of article-engaging members which are of substantially L-shape and each of which is pivoted at its vertex to the wheel adjacent its periphery, said members being disposed in circumferentially spaced relationship, and an upstanding plate disposed on said wheel between each pair of adjacent article-engaging members.

WILLIAM L. McNAMARA.
JAMES McFEE.

REFERENCES CITED

The following references are of record in the file of this patent:

UNITED STATES PATENTS

| Number | Name | Date |
|---|---|---|
| 1,326,903 | Augensen | Jan. 6, 1920 |
| 1,457,364 | Hallock et al. | June 5, 1923 |
| 1,850,480 | Sledge et al. | Mar. 22, 1932 |
| 1,972,753 | Bausman | Sept. 4, 1934 |
| 2,113,929 | Benoit | Apr. 12, 1938 |
| 2,362,132 | Haub | Nov. 7, 1944 |